2,995,535
STYRENE-ALLYL ALCOHOL UNSATURATED DIBASIC ACID TERPOLYMERS

John M. Gethins and Raymond I. Longley, Jr., Springfield, Mass., assignors to Monsanto Chemical Company, St. Louis, Mo., a corporation of Delaware
No Drawing. Filed Apr. 8, 1958, Ser. No. 727,041
7 Claims. (Cl. 260—23.5)

This invention relates to new terpolymeric systems. More particularly, it relates to novel terpolymers containing both hydroxyl and carboxyl groups through which inter-molecular esterification may occur.

One object of this invention is to provide new terpolymeric systems.

A further object is to provide novel terpolymers containing both hydroxyl and carboxyl groups.

A further object is to provide novel thermoplastic terpolymers wherein a portion of the terpolymeric units are linearly esterified to form polymers of relatively high average molecular weight.

Another object is to provide novel thermosetting terpolymers wherein a portion of the terpolymeric units are cross-linked through inter-molecular esterification.

These and other objects are attained by copolymerizing an allyl alcohol component with a styrene component and an unsaturated dibasic acid component.

The following examples are given in illustration of the invention and are not intended as limitations thereon. Where parts are mentioned they are parts by weight.

Example I 400 parts of allyl alcohol are heated in a closed pressure vessel to a temperature of 160° C. Then, over a 5 hour period, a solution of 300 parts of allyl alcohol, 300 parts of styrene, 10 parts of maleic anhydride and 20 parts of ditertiarybutyl peroxide is continuously charged under pressure, with stirring, while maintaining the temperature at 160±5° C. Polymerization is continued for 30 minutes after all of the components have been charged. The product is a yellowish syrup of terpolymer dissolved in unreacted monomers. The unreacted monomers are removed by vacuum distillation to a final temperature of 220° C. at 1 mm. of Hg pressure. A clear, brittle, partially esterified thermoplastic terpolymer, soluble in acetone, dimethyl formamide and xylene-butanol mixtures is obtained in about 38% conversion The terpolymer contains about 5.7% free hydroxyl groups by weight and about 0.6% free carboxyl groups by weight.

Example II

A glycerol-maleic anhydride half-ester is prepared by reacting 200 parts of glycerol with 210 parts of maleic anhydride at a temperature of 100° C. Example I is repeated, substituting 40 parts of the crude glycerol-maleic anhydride half-ester for the 10 parts of maleic anhydride used therein. A light yellow, brittle, partially esterified thermoplastic terpolymer, soluble in acetone, dimethyl formamide and xylene-butanol mixtures is obtained in about 42% conversion. The terpolymer contains about 6% free hydroxyl groups by weight and about 0.55% free carboxyl groups by weight.

Example III

Mix together 45 parts of styrene, 25 parts of allyl alcohol, 30 parts of itaconic acid and 2 parts of ditertiarybutyl peroxide. Heat the mixture, with stirring, in a closed pressure vessel for about 1 hour, maintaining a temperature of about 130° C. The product is a yellowish syrup of a terpolymer dissolved in unreacted monomers. The terpolymer is recovered by spray drying under vacuum at a temperature of about 200° C. Yellowish terpolymer solids are obtained which are soluble in acetone, dimethylformamide and xylene-butanol mixtures. Further heating of the terpolymer results in a cross-linked, thermoset terpolymer which is insoluble in these common solvents.

The three components of this invention are allyl or methallyl alcohol, styrene, or a ring-substituted styrene and an unsaturated dibasic acid. The allyl or methallyl alcohol may constitute from 1 to 30% by weight of the terpolymer, the styrene compound may constitute from 30 to 90% by weight of the terpolymer and the unsaturated dibasic acid may constitute from 1 to 40% by weight of the terpolymer. The materials comprising the styrene component are styrene, ring-substituted alkyl styrenes such as ortho, meta and para-methyl, ethyl, butyl, etc. styrenes, ortho-para or ortho-meta dimethyl or diethyl styrenes, ring-substituted chlorostyrenes such as the mono-, di-, and trichlorostyrenes, and alkyl chlorostyrenes such as ortho-methyl para-chlorostyrene. Mixtures of two or more of the styrene compounds may be used.

The unsaturated dibasic acid components employed are alpha, beta, ethylenically unsaturated dicarboxylic acids containing 4 and 5 carbon atoms such as maleic acid, fumaric acid, citraconic acid, mesaconic acid and itaconic acid. The anhydrides or mixed anhydrides of these acids are fully substitutable for all or part thereof. Mixtures of these acids, anhydrides and mixed anhydrides may be used. In another embodiment, the half-esters of these acids with 1–10 carbon atom aliphatic alcohols, glycols, or polyols may be employed, e.g., with ethanol, isobutanol, n-decanol, ethyleneglycol, glycerol, etc.

In preparing the terpolymers of this invention, the three types of monomeric components may be mixed together with or without an organic solvent inert to the reactants. The mixture may contain a free radical polymerization initiator. The mixture should be heated in a closed pressure vessel at from 80 to 250° C. under autogenous pressures or at pressures of up to 60,000 p.s.i. under an inert atmosphere, e.g., nitrogen, etc. Temperatures of 130–200° C. are preferred. Conversions of from 30–70% are obtainable depending upon the conditions chosen and the length of polymerization time permitted.

The proportions of each component which combine to form the terpolymer is of course dependent in large part upon the proportions in which they are charged to the pressure reactor. However, temperature, pressure, initiator concentration and reaction time have also been found to have a significant effect. At the higher polymerization temperatures, i.e., approaching 250° C. the terpolymer composition will more closely approach the charge composition (total material in the reactor). As lower temperatures are used, the terpolymer becomes disproportionately rich in the more easily polymerized components, primarily styrene and then the dibasic acid. Pressure has been found to have about the same effect as temperature, i.e., at higher pressures the terpolymer composition tends to approach the charge composition. Increasing initiator concentration tends to decrease the molecular weight and make the terpolymer disproportionately rich in allyl alcohol. When extended polymerization cycles are used the terpolymer composition will tend to change with time as the proportions of the unreacted monomers change.

As initially formed the terpolymers contain both reactive hydroxyl groups and reactive carboxyl groups. Further heating of the terpolymer, at reaction temperatures, e.g., 80–250° C., causes inter-molecular esterification to take place. Any degree of esterification may be effected depending upon the reaction period and temperature used. Analysis for free carboxyl groups before and after esterification will disclose the degree of esterification if this information is desired. Those terpolymers containing only a small proportion of unsaturated dibasic acid, i.e., from 1% to about 15% by weight, esterify to form essentially linear thermoplastic resins. However, those terpolymers containing higher proportions of unsaturated dibasic acid, i.e., from about 15% to about 40% by weight, esterify to form cross-linked permanently thermoset resins.

When the polymerization is complete the reaction mixture consists of a syrupy solution of terpolymer in unreacted monomers. Those terpolymers of the thermosetting class must be recovered from the reaction mixture before an appreciable quantity thereof become cross-linked by esterification. Such recovery should be effected as soon as possible after polymerization to a reasonable yield has been completed and it should be performed without subjecting the terpolymer to excessive or prolonged heat. It has been found that spray drying gives good results. However, the recovery procedure is not intended as a limitation on this invention and any conventional means for attaining this end may be employed, e.g., precipitation by a non-solvent, etc. Those terpolymers of the thermoplastic class may be esterified either before or after recovery, as desired. Again, this invention is not limited by the recovery procedure, any conventional means being satisfactory, e.g., vacuum distillation, spray drying, precipitation by a non-solvent, etc.

The terpolymers obtained are generally hard, brittle resins of a light-yellowish color. Before esterification they generally contain from about 0.25 to 9% hydroxyl groups by weight and from about 0.3 to 17% by weight of carboxyl groups. Any degree of esterification may be effected depending upon the average molecular weight desired. The thermosetting resins are usually esterified coincidental with fabrication by, e.g., molding, etc.

In a preferred embodiment the process consists of precharging an excess of the allyl alcohol component to a closed pressure vessel equipped with suitable agitation and means for continuously feeding and drawing off a fluid stream. The allyl alcohol is heated to the desired polymerization temperature and a fluid mixture of the three monomeric components and initiator is continuously pumped into the pressurized vessel at a rate consistent with uniform polymerization. If necessary, cooling may be used to maintain the desired polymerization temperature during the reaction. Autogenous pressures or pressures of up to 60,000 p.s.i. are used. A product stream is continuously drawn off, the terpolymer is recovered according to conventional techniques as previously described and the unreacted monomers are recycled to the reactor.

The reaction may be carried out in the presence of a conventional free radical polymerization initiator. For example, peroxides such as benzoyl peroxide, tertiary-butyl perbenzoate, pinacolone peroxide, ditertiarybutyl peroxide, hydrogen peroxide, etc., and hydroperoxides such as tertiary butyl cumene, etc. Other suitable free radical initiators include air, oxygen, ozonides, azo compounds, high energy radiations, etc. The amount of initiator may vary between 0.1 and 5 parts per 100 parts of monomer mixture.

The thermoplastic terpolymers of this invention may be used as adhesives, molding compounds, etc. when suitably plasticized with conventional plasticizers, e.g., fatty acids. For example, a thermoplastic terpolymer may be plasticized by heating it with a small proportion of stearic acid for several hours at a temperature of from 150–300° C. However, these thermoplastic terpolymers are particularly useful as primary components in surface coating resins. In one embodiment, films are cast from solutions containing a thermoplastic terpolymer, a cross-linking thermosetting resin and a plasticizer. Such resins as melamine-aldehyde, urea-aldehyde, phenol-aldehyde, isocyanate and polyisocyanate resins may be employed as cross-linking agents. Especially suitable plasticizers for this use are fatty acids such as stearic acid, etc. Conventional surface coating vehicles may be used, e.g., acetone, methyl-ethyl-ketone, xylene, xylene-butanol mixtures, aliphatic alcohols, etc.

In another, and more preferred, embodiment, surface coating resins are prepared by esterifying the thermoplastic terpolymer with a drying oil fatty acid to produce films capable of air drying. Unsaturated fatty acids containing from 10–18 carbon atoms are employed. These include the decylenic acids, palmitoleic acid, oleic acid, linoleic acid, linolenic acid, etc., and mixtures thereof. Preferably, the fatty acid derivatives of drying or semidrying oils containing mixtures of these unsaturated fatty acids are employed. For example, the fatty acid derivatives of cottonseed oil, tall oil, soybean oil, linseed oil, dehydrated castor oil, safflower oil, etc., may be employed. If desired, a conventional drier such as cobalt naphthenate, etc., may be added and/or the films may be air dried at from 150–300° C. to facilitate drying. Generally, from 0.3–1.0 equivalent of fatty acids are used per hydroxyl equivalent of terpolymer.

*Example IV*

70 parts of the terpolymer of Example I and 30 parts of dehydrated castor acids are heated to a temperature of 225° C. to esterify. When the reaction subsides, the temperature is increased to 300° C. to complete the esterification. The reaction mixture is cooled and dissolved in 100 parts of xylene. This 50% solids solution is then cast as a 0.003 inch film on a clean glass plate and is allowed to dry for 24 hours at room temperature. A cured, hard clear film is obtained which is substantially unaffected by such solvents as xylene and 10% aqueous sodium hydroxide solution.

The thermosetting terpolymers of this invention may be used as molding powders or as water-proof laminating adhesives in a hot press method.

The compositions of this invention may be used alone or in co-mixture with other resins compatible therewith. They may also be combined with conventional additives such as pigments, plasticizers, fillers, stabilizers, etc.

The foregoing description and particularly the examples are illustrative of this invention and it is obvious that many variations may be made within the spirit and scope thereof.

What is claimed is:

1. A terpolymer of an allyl alcohol, a styrene and an unsaturated dibasic acid, the amount of allyl alcohol component in the terpolymer varying from 1 to 30% by weight, the amount of styrene component in the terpolymer varying from 30 to 90% by weight and the amount of unsaturated dibasic acid in the terpolymer varying from 1 to 40% by weight, the allyl alcohol component being a member of the group consisting of allyl alcohol, methallyl alcohol and mixtures thereof, the styrene component being a member of the group consisting of styrene, ring-substituted alkyl styrenes, ring-substituted mono-, di- and trichlorostyrenes and ring-substituted alkyl chlorostyrenes wherein the alkyl group contains from 1–4 carbon atoms and mixtures thereof and the unsaturated dibasic acid component being a member of the group consisting of 4 and 5 carbon alpha, beta ethylenically unsaturated dicarboxylic acids, their anhydrides and mixed anhydrides and the half-esters thereof with 1–10 carbon aliphatic alcohols, glycols and polyols.

2. A terpolymer as in claim 1 wherein the allyl alcohol is allyl alcohol.

3. A terpolymer as in claim 1 wherein the styrene component is styrene.

4. A terpolymer as in claim 1 wherein the unsaturated dibasic acid is a member of the group consisting of maleic acid and maleic anhydride.

5. A surface coating composition comprising an organic solvent solution of the reaction product of (1) a terpolymer of an allyl alcohol, a styrene and an unsaturated dibasic acid, the amount of allyl alcohol component in the terpolymer varying from 1 to 30% by weight, the amount of styrene component in the terpolymer varying from 30 to 90% by weight and the amount of unsaturated dibasic acid in the terpolymer varying from 1 to 40% by weight, the allyl alcohol component being a member of the group consisting of allyl alcohol, methallyl alcohol and mixtures thereof, the styrene component being a member of the group consisting of styrene, ring-substituted alkyl styrenes, ring-substituted mono-, di- and tri-chlorostyrenes and ring-substituted alkyl chlorostyrenes wherein the alkyl group contains from 1–4 carbon atoms and mixtures thereof and the unsaturated dibasic acid component being a member of the group consisting of 4 and 5 carbon alpha, beta ethylenically unsaturated dicarboxylic acids, their anhydrides and mixed anhydrides and the half-esters thereof with 1–10 carbon aliphatic alcohols, glycols and polyols, and (2) an unsaturated fatty acid selected from the group consisting of unsaturated fatty acids containing from 10–18 carbon atoms and the fatty acid derivatives of drying and semi-drying oils containing mixtures thereof; from 0.3–1.0 equivalent of fatty acids being present for each hydroxyl equivalent of terpolymer.

6. A process for preparing a terpolymer of an allyl alcohol component, a styrene component and an unsaturated dibasic acid component which comprises (1) intimately mixing together (a) from 1–30 parts by weight of an allyl alcohol component, (b) from 30–90 parts by weight of a styrene component, and (c) from 1–40 parts by weight of an unsaturated dibasic acid component, and (2) heating the mixture at a temperature of from 80–250° C. to polymerize the same; the allyl alcohol component being a member of the group consisting of allyl alcohol, methallyl alcohol and mixtures thereof, the styrene component being a member of the group consisting of styrene, ring-substituted alkyl styrenes, ring-substituted mono-, di- and tri-chlorostyrenes and ring-substituted alkyl chlorostyrenes wherein the alkyl group contains from 1–4 carbon atoms and mixtures thereof and the unsaturated dibasic acid component being a member of the group consisting of 4 and 5 carbon alpha, beta ethylenically unsaturated dicarboxylic acids, their anhydrides and mixed anhydrides and the half-esters thereof with 1–10 carbon aliphatic alcohols, glycols and polyols.

7. A process for preparing a terpolymer of an allyl alcohol, a styrene and an unsaturated dibasic acid which comprises (1) heating an excess of the allyl alcohol component to from 80–250° C. in a closed pressure vessel, (2) continuously charging under pressure a fluid mixture of (a) from 1–30 parts by weight of an allyl alcohol component, (b) from 30–90 parts by weight of a styrene component, and (c) from 1–40 parts by weight of an unsaturated dibasic acid component at a rate consistent with uniform polymerization, and (3) continuously polymerizing the same as charged under substantially isothermal conditions and under autogenous pressure; the allyl alcohol component being a member of the group consisting of allyl alcohol, methallyl alcohol and mixtures thereof, the styrene component being a member of the group consisting of styrene, ring-substituted alkyl styrenes, ring-substituted mono-, di- and tri-chlorostyrenes and ring-substituted alkyl chlorostyrenes wherein the alkyl group contains from 1–4 carbon atoms and mixtures thereof and the unsaturated dibasic acid component being a member of the group consisting of 4 and 5 carbon alpha, beta ethylenically unsaturated dicarboxylic acids, their anhydrides and mixed anhydrides and the half-esters thereof with 1–10 carbon aliphatic alcohols, glycols and polyols.

References Cited in the file of this patent

UNITED STATES PATENTS

| | | |
|---|---|---|
| 2,340,110 | D'Alelio | Jan. 25, 1944 |
| 2,378,827 | Bradley | June 19, 1945 |
| 2,855,388 | Chapin et al. | Oct. 7, 1958 |

OTHER REFERENCES

Teeter et al.: Article in "Oil and Soaps," pp. 177–180, July 1945.

"Allyl Alcohol," Shell Chem. Corp., San Francisco, Calif., pp. 26–31 (1946).